(12) United States Patent
Ahn et al.

(10) Patent No.: US 9,697,412 B2
(45) Date of Patent: Jul. 4, 2017

(54) METHOD OF EXECUTING FUNCTION OF ELECTRONIC DEVICE AND ELECTRONIC DEVICE USING THE SAME

(71) Applicant: Samsung Electronics Co., Ltd., Gyeonggi-do (KR)

(72) Inventors: Yumi Ahn, Seoul (KR); Hyunkyoung Kim, Seoul (KR); Daesung Kim, Gyeonggi-do (KR); Jihyun Ahn, Seoul (KR); Hyemi Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 14/588,590

(22) Filed: Jan. 2, 2015

(65) Prior Publication Data
US 2015/0186710 A1    Jul. 2, 2015

(30) Foreign Application Priority Data

Jan. 2, 2014 (KR) .................. 10-2014-0000177

(51) Int. Cl.
| G06K 9/00 | (2006.01) |
| G06K 9/62 | (2006.01) |
| G06T 11/00 | (2006.01) |
| G07C 9/00 | (2006.01) |
| G06F 21/32 | (2013.01) |

(52) U.S. Cl.
CPC ......... *G06K 9/00087* (2013.01); *G06F 21/32* (2013.01); *G06K 9/6201* (2013.01); *G06T 11/00* (2013.01); *G07C 9/00007* (2013.01)

(58) Field of Classification Search
None
See application file for complete search history.

(56) References Cited

U.S. PATENT DOCUMENTS

| 6,910,132 B1* | 6/2005 | Bhattacharya | G06F 21/32 707/999.001 |
| 2002/0030359 A1* | 3/2002 | Bergenek | G06F 21/32 283/68 |
| 2003/0039382 A1* | 2/2003 | Yau | G06K 9/00067 382/125 |
| 2004/0215615 A1* | 10/2004 | Larsson | G06K 9/00013 |
| 2006/0120578 A1 | 6/2006 | Shatford | |

(Continued)

FOREIGN PATENT DOCUMENTS

KR          100397916          9/2003

OTHER PUBLICATIONS

European Search Report dated Jun. 12, 2015 issued in counterpart application No. 14200607.1-1853, 7 pages.

*Primary Examiner* — Sumati Lefkowitz
*Assistant Examiner* — Ryan P Potts
(74) *Attorney, Agent, or Firm* — The Farrell Law Firm, P.C.

(57) ABSTRACT

Methods and apparatuses are provided for executing a function of an electronic device using fingerprint verification. A security level of the function to be performed is acquired, if the function requires the fingerprint verification. A fingerprint input of a user is received. A count of a number of matching points that exist between the fingerprint input and a prestored fingerprint is determined. The count of the number of matching points is compared with a minimum number of matching points corresponding to the security level of the function.

19 Claims, 10 Drawing Sheets

(56) References Cited

U.S. PATENT DOCUMENTS

2008/0013808 A1* 1/2008 Russo ................ G06K 9/00026
　　　　　　　　　　　　　　　　　　　　　　382/125
2010/0225443 A1　　9/2010 Bayram et al.
2015/0137938 A1* 5/2015 Slaby ...................... G06F 21/32
　　　　　　　　　　　　　　　　　　　　　　340/5.53

* cited by examiner

<620>

<720>

METHOD OF EXECUTING FUNCTION OF ELECTRONIC DEVICE AND ELECTRONIC DEVICE USING THE SAME

PRIORITY

This application claims priority under 35 U.S.C. §119(a) to Korean Patent Application No. 10-2014-0000177, filed on Jan. 2, 2014, the content of which is incorporated herein by reference.

BACKGROUND OF THE INVENTION

1. Field of the Invention

The present invention relates generally to a method of executing a function of an electronic device and an electronic device using the same, and more particularly, to a method of executing a function of an electronic device by varying an accuracy of fingerprint verification depending upon the security level of the corresponding function and an electronic device using the same.

2. Description of the Related Art

Electronic devices provide a variety of useful functions to users through applications while also taking the form of mobile terminals, such as, for example, smart phones. Among the various functions the electronic devices provide, fingerprint verification technology has recently attracted a lot of attention.

Due to the carelessness of users of mobile terminals, it may be possible for third parties may to gain access to mobile terminals without being authorized. In this case, the users' personal information may be imprudently distributed among other people. Additionally, these days, payment using smart phones can be made at anytime and anywhere, and therefore the users are more likely to suffer monetary losses.

Although users make use of protection means, such as passwords and accredited certificates, to prevent unauthorized use, such protection means may be easily exposed using malignant codes and hacking tools.

In fingerprint verification, the same security level is set for all functions without consideration for the importance of the function a user wants to execute. In this case, if some functions have a low security level, personal information is likely to be leaked, and if other functions have a high security level, a fingerprint verification rate is decreased, thereby causing a problem of usability.

Specifically, when accuracy of fingerprint verification for executing a function is increased, a fingerprint verification error is more likely to occur, and functions that have to be executed fast or frequently may encounter usability problems.

In addition, when accuracy of fingerprint verification for executing a function is decreased, a fingerprint verification error is less likely to occur. However, functions requiring a high security level are too easily executed, thereby causing a security problem.

SUMMARY OF THE INVENTION

The present invention has been made to address at least the above problems and/or disadvantages and to provide at least the advantages described below. Accordingly, an aspect of the present invention provides a method of setting a different security level for each function when a variety of functions are executed in an electronic device using fingerprint verification, and an electronic device using the same.

For example, when simple authentication is required, the security level can be decreased to enhance usability, and when security processing is important, the security level can be increased to enhance security.

In accordance with one aspect of the present invention, a method is provided for executing a function of an electronic device using fingerprint verification. A security level of the function to be performed is acquired, if the function requires the fingerprint verification. A fingerprint input of a user is received. A count of a number of matching points that exist between the fingerprint input and a prestored fingerprint is determined. The count of the number of matching points is compared with a minimum number of matching points corresponding to the security level of the function.

In accordance with another aspect of the present invention, a method is provided for executing a function of an electronic device using fingerprint verification. A number of required matching points corresponding to the function to be performed is acquired, if the function requires the fingerprint verification. A fingerprint input of a user is received. A count of a number of matching points that exist between the fingerprint input and a prestored fingerprint is determined. The count of the number of matching points is compared with the number of required matching points.

In accordance with an additional aspect of the present invention, an electronic device is provided that includes a display unit configured to display an indication and a guide for inputting a fingerprint. The electronic device also includes a fingerprint sensor configured to sense a fingerprint input of a user, and a storage unit configured to store the fingerprint input. The electronic device additionally includes a controller configured to acquire a security level of a function to be performed if the function requires fingerprint verification, receive the fingerprint input, determine a count of a number of matching points that exist between the fingerprint input and a prestored fingerprint, and compare the count of the number of matching points with a minimum number of matching points corresponding to the security level.

In accordance with a further aspect of the present invention, an electronic device is provided that includes a display unit configured to display an indication and a guide for inputting a fingerprint. The electronic device also includes a fingerprint sensor configured to sense a fingerprint input of a user, and a storage unit configured to store the fingerprint input. The electronic device additionally includes a controller configured to acquire a number of required matching points corresponding to the function to be performed if the function requires the fingerprint verification, receive the fingerprint input, determine a count of a number of matching points that exist between fingerprint input and a prestored fingerprint, and compare the count of the number of matching points with the number of required matching points.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF THE EMBODIMENTS OF THE PRESENT INVENTION

Figure 1:
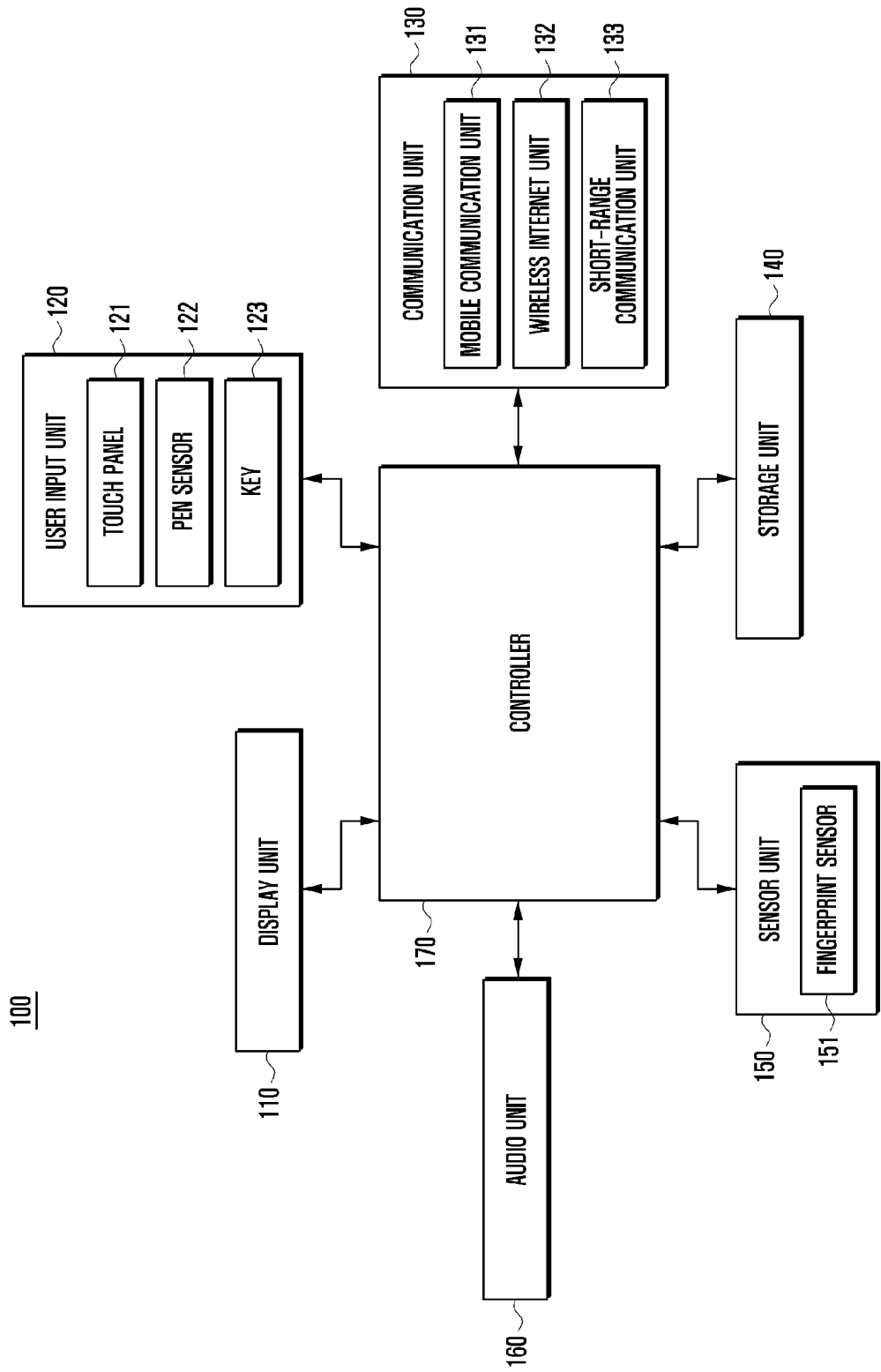
FIG. 1 is a block diagram illustrating an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

An electronic device 100, according to an embodiment of the present invention, may be a device with a communication function. For example, the electronic device may be a combination of one or more of a smartphone, a tablet personal computer, a mobile phone, a video phone, an e-book reader, a desktop personal computer, a laptop personal computer, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a home appliance (e.g. a refrigerator, an air conditioner, a cleaner, an oven, a microwave oven, a washing machine, a vacuum cleaner, etc.), an artificial intelligent robot, a Television (TV), a Digital Video Disk (DVD) player, an audio player, various medical machines (e.g. a Magnetic Resonance Angiography (MRA), a Magnetic Resonance Imaging (MRI), a Computed Tomography (CT), a tomography camera, a sonography device, etc.), a navigation device, a Global Positioning System (GPS) receiver, an Event Data Recorder (EDR), a Flight Data Recorder (FDR), a set-top box, a TV box, an electronic dictionary, a vehicle infotainment device, electronic equipment for a ship (e.g. navigation equipment for a ship, a gyrocompass, etc.), avionic equipment, a security device, an electronic cloth, an electronic key, a camcorder, a game console, a Head-Mounted Display (HMD), a flat panel display device, an electronic frame, an electronic album, a furniture or a part of a building/structure including a communication function, an electronic board, an electronic signature receiving device, a projector, etc. . . . It is obvious to those skilled in the art that the electronic device, according to an embodiment of the present invention, is not limited to the aforementioned devices.

FIG. 1 is a block diagram of the electronic device 100, according to an embodiment of the present invention.

According to an embodiment of the present invention, the electronic device 100 includes a display unit 110, a user input unit 120, a communication unit 130, a storage unit 140, a sensor unit 150, an audio unit 160, and a controller 170.

According to an embodiment of the present invention, the display unit 110 may display images or data to a user. The display unit 110 may include a display panel. Examples of the display panel may include Liquid Crystal Display (LCD) panels and Active Matrix Organic Light Emitting Diode (AM-OLED) panels. In this case, the display unit 110 may further include a controller for controlling the display panel. For example, the display panel may be implemented in a flexible, transparent, or wearable shape.

According to an embodiment of the present invention, the display unit 110 may be provided in a touch screen shape with a touch panel 121 coupled thereto. For example, the touch screen may include an integrated module in which a display panel and a touch panel are stacked on each other.

According to an embodiment of the present invention, the display unit 110 may output a screen for receiving a user fingerprint under control of the controller 170. For example, the display unit 110 may output an indication on a partial or full screen thereof to request a user to input a fingerprint. When the fingerprint is verified, the screen may be changed into a screen for a function that the user wants to execute. In contrast, when the fingerprint is not verified, the display unit 110 may output a message to request the user to input a fingerprint again. If the user repeatedly fails in the fingerprint verification, the display unit 110 may output a message to induce the user to adjust the security level. When the user accepts the message, the display unit 110 may output a screen for adjusting a security level, thereby recommending an optimal security level to the user therethrough.

According to an embodiment of the present invention, the display unit 110 may output a guide for a user to accurately input a fingerprint under the control of the controller 170.

According to an embodiment of the present invention, the display unit 110 may display a partial or full screen thereof in different colors depending upon the security level. For example, the display unit 110 may display the screen in red for functions requiring higher security levels and in green for functions requiring lower security levels.

According to an embodiment of the present invention, the display unit 110 may display an animation and a guide for a user to accurately input a fingerprint. For example, for functions requiring higher security levels, the display unit 110 may display a slow-motion animation for fingerprint input, together with a message to request a user to input a fingerprint at a slow speed.

According to an embodiment of the present invention, the user input unit 120 may receive various instructions from a user. The user input unit 120 may include, for example, at least one of the touch panel 121, a pen sensor 122, and a key 123.

According to an embodiment of the present invention, the touch panel 121 may recognize a user's touch input through at least one of a capacitive type, a resistive type, an infrared type, and an acoustic wave type. The touch panel 121 may further include a controller. A capacitive type touch panel may recognize proximity input in addition to direct touch input. The touch panel 121 may further include a tactile layer. In this case, the touch panel 121 may provide a user with a tactile reaction. The pen sensor 122 may be implemented using a separate sheet for pen recognition in the same manner as receiving a user's touch input. Examples of the key 123 may include a mechanical key and a touch key. For example, the mechanical key may include at least one of a power button provided on one side of the electronic device 100 to turn on a display thereof when pushed, a volume button provided on the other side of the electronic device 100 to control volume when pushed, and a home button provided on a lower central portion of the display unit 110 of the electronic device 100 to perform switching to a home screen when pushed. The touch key may include at least one of a menu key provided on one surface of a lower end of the display unit 110 of the electronic device 100 to provide a menu related to the currently displayed content when touched, and a return key provided on another surface of the lower end of the display unit 110 of the electronic device 100 to switch a currently displayed screen to the previous screen when touched.

According to an embodiment of the present invention, the communication unit 130 may establish a communication channel of a preset scheme with a serviceable network (mobile communication network) under the control of the controller 170, and transmit/receive a signal related to wireless communication, such as voice or video communication, and message service-based data communication, such as a Short Message Service (SMS), a Multimedia Messaging Service (MMS), or Internet.

According to an embodiment of the present invention, the communication unit 130 may receive data on types of fingerprint verification errors from a fingerprint verification server or transmit data on types of fingerprint verification errors, stored in the storage unit 140 of the electronic device 100, to the fingerprint verification server under the control of the controller 170. Through the transfer of data on the types of frequently occurring fingerprint verification errors from/to the fingerprint verification server, the electronic device 100 may provide sources for analyzing types and causes of the errors and receive solutions to the errors according to the types thereof.

According to an embodiment of the present invention, the communication unit 130 may include at least one of a mobile communication unit 131, a wireless internet unit 132, and a short-range communication unit 133.

According to an embodiment of the present invention, the mobile communication unit 131 transmits/receives a wireless signal to/from at least one of a base station, an external terminal, and a server on a mobile communication network. The wireless signal may include various types of data according to transmission/reception of a voice call signal, a video call signal, and SMS/multimedia message.

According to an embodiment of the present invention, the wireless internet unit 132 performs a function for wireless internet access. Examples of wireless internet technology may include Wireless Local Area Network (WLAN) Wireless-Fidelity, Wireless broadband, World Interoperability for Microwave Access, and High Speed Downlink Packet Access (HSDPA).

According to an embodiment of the present invention, the short-range communication unit 133 performs a function for short-range communication. Examples of short-range communication technology may include BLUETOOTH™, Radio Frequency Identification (RFID), Infrared Data Association, Ultra Wideband (UWB), and ZIGBEE™.

According to an embodiment of the present invention, the storage unit 140 may include at least one of an internal memory and an external memory.

According to an embodiment of the present invention, the internal memory may include at least one of a volatile memory (e.g., a Dynamic Random Access Memory (DRAM), a Synchronous Dynamic RAM (SDRAM), and a Synchronous Dynamic RAM (SDRAM)), a non-volatile memory (e.g., an One Time Programmable Read-Only Memory (OTPROM), a Programmable ROM (PROM), an Erasable and Programmable ROM (EPROM), an Electrically Erasable and Programmable ROM (EEPROM), a Mask ROM, and a Flash ROM), a Hard Disk Drive (HDD), and a Solid State Drive (SSD). According to an embodiment of the present invention, the controller 170 may load instructions or data, received from at least one of a non-volatile memory and other components, in a volatile memory and process the loaded instructions or data. In addition, the controller 170 may store data, received or generated from another component, in a nonvolatile memory.

According to an embodiment of the present invention, the external memory may include at least one of a Compact Flash (CF), a Secure Digital (SD), a Micro Secure Digital, a Mini Secure Digital (Mini-SD), an extreme Digital (xD) and a memory stick.

According to an embodiment of the present invention, the storage unit 140 may store an operating system controlling resources of the electronic device 100 and application programs for operating applications. The operating system may include a kernel, middleware, and an Application Program Interface (API).

According to an embodiment of the present invention, the storage unit 140 may store user fingerprint information acquired through a fingerprint sensor 151 of the electronic device 100. The previously stored user fingerprint information may be compared with fingerprint information sensed when a particular function is executed.

According to an embodiment of the present invention, a fingerprint may be verified by returning a True or False value through a comparison between fingerprint information sensed when a user executes a particular function and the previously stored fingerprint information in the storage unit 140. The fingerprint information may be compared with each other using minutiae thereof. Specifically, minutiae of a fingerprint sensed when a particular function is executed is compared with minutiae of fingerprints previously stored in the storage unit 140, thereby measuring the number of matching points of the corresponding fingerprint.

According to an embodiment of the present invention, minutiae may have a comprehensive meaning including a ridge ending point where a ridge of a fingerprint terminates and bifurcations where a single ridge splits into two ridges. Matching points may mean minutiae when minutiae of a fingerprint sensed when a particular function is executed is in agreement with minutiae of the fingerprints previously stored in the storage unit 140

According to an embodiment of the present invention, when the number of matching points measured is greater than or equal to that of a minimum number of matching points depending upon a security level of a function, a user can execute the corresponding function, and when not, an error may occur.

According to an embodiment of the present invention, the storage unit 140 may store security level information required for executing functions of the electronic device 100 differently, according to the functions. For example, the storage unit 150 may save the security level as the first level for a function requiring higher security, such as a payment function, and as the third level for a function for which usability is a high priority, such as an unlock function.

According to an embodiment of the present invention, the storage unit 140 may store the number of matching points required for executing functions of the electronic device 100 differently, according to the functions. That is, the storage unit 140 may store the specific number of matching points, instead of storing the particular range thereof as in the security level. The number of required matching points may mean the minimum number of matching points required to execute the corresponding function, and when the number of matching points of a fingerprint sensed for execution of the corresponding function exceeds the number of required matching points, the corresponding function may be executed. For example, the number of required matching points may be set to thirty four for a function requiring higher security, such as a payment function, and to seventeen for a function for which usability is a high priority, such as an unlock function.

According to an embodiment of the present invention, the storage unit 140 may store data on fingerprint verification errors occurring when a particular function is executed. For example, if an error occurs when a user executes a particular function, the storage unit 140 may store the number of matching points measured at that time. An average value may be calculated using the stored number of matching points and used when the controller 170 recommends an optimal security level or the number of required matching points to the user.

According to an embodiment of the present invention, the sensor unit 150 includes the fingerprint sensor 151. The fingerprint sensor 151 collects a user's fingerprint information.

According to an embodiment of the present invention, the f collected fingerprint information may be stored in the storage unit 140 by the controller 170. The fingerprint sensor 151 may collect the fingerprint information from the user when the electronic device 100 is driven for the first time after initialized in a factory. In addition, even though it is not the first time the electronic device 100 has been driven, the fingerprint sensor 151 may collect or recollect a user's fingerprint information by executing a control mode of the electronic device 100. The collected or recollected fingerprint information may be stored in the storage unit 140 by the controller 170.

According to an embodiment of the present invention, the fingerprint sensor 151 may collect fingerprint information sensed when a function of the electronic device 100 is executed. The collected fingerprint information may be stored in the storage unit 140 by the controller 170. The controller 170 may determine whether to execute the function, by comparing the sensed fingerprint information with the user's previously stored fingerprint information in the storage unit 140.

According to an embodiment of the present invention, the fingerprint sensor 151 may be included in the touch screen in which the display unit 110 and the touch panel 121 are coupled to each other. The sensor unit 150 may further include a control circuit for controlling at least one sensor included therein.

According to an embodiment of the present invention, the audio unit 160 may bilaterally convert between a voice and an electrical signal. For example, the audio unit 160 may include at least one of a speaker, a receiver, earphones, and a microphone, and convert input or output voice information.

According to an embodiment of the present invention, when a user successfully inputs fingerprint information through the fingerprint sensor 151, the audio unit 160 may output a sound informing that the fingerprint information has been successfully input. In contrast, when the fingerprint information is not verified, the audio unit 160 may output a sound for requesting the user to input fingerprint information again.

According to an embodiment of the present invention, the electronic device 100 may further include a camera unit. The camera unit may take a still image and a moving image and include one or more image sensors (e.g., a front or rear lens), an Image Signal Processor (ISP), and/or a flash LED, according to implemented embodiments. The camera unit may also be configured to include at least one part of the controller 170. For example, the camera unit may perform an operation of correcting an image or extracting characteristics thereof, in addition to an operation of acquiring an image. In this case, the camera unit may be a functional module having hardware and software modules.

According to an embodiment of the present invention, the controller 170 may control an overall operation of the electronic device 100 and switch and control operations of the electronic device 100 depending upon a user input entered through the display unit 110 or the user input unit 120.

According to an embodiment of the present invention, the controller 170 may acquire a user's fingerprint information through the fingerprint sensor 151. The controller 170 may store the acquired fingerprint information in the storage unit 140. When a user executes a particular function, the controller 170 may determine whether fingerprint verification is required for the corresponding function. For example, when the determination result shows that fingerprint verification is not required for the corresponding function, the controller 170 may execute the function desired by the user, without any separate fingerprint input. In contrast, when the determination result shows that fingerprint verification is required for the corresponding function, the controller 170 may perform a step for inputting a fingerprint.

According to an embodiment of the present invention, the controller 170 may receive a user's fingerprint information through the fingerprint sensor 151 to execute a function of the electronic device 100. The controller 170 may extract minutiae of the fingerprint sensed through the fingerprint sensor 151. The controller 170 may measure the number of matching points by comparing minutiae of the previously stored fingerprint information in the storage unit 140 with minutiae of the fingerprint information sensed to execute the particular function.

According to various embodiments of the present invention, the controller 170 may compare the minimum number of matching points depending upon security levels, stored in the storage unit 140, with the number of matching points of a fingerprint sensed when a function is executed. The controller 170 may execute the corresponding function when the number of matching points sensed is greater than or equal to the minimum number of matching points depending upon security levels. The controller 170 may display an error message without executing the corresponding function when the number of matching points sensed is smaller than the minimum number of matching points depending upon security levels.

According to an embodiment of the present invention, the controller 170 may compare the number of required matching points stored in the storage unit 140 with the number of matching points of a fingerprint sensed when a function is executed. The controller 170 may execute the corresponding function when the number of matching points sensed is greater than or equal to the number of required matching points. The controller 170 may display an error message without executing the corresponding function when the number of matching points sensed is less than the number of required matching points.

According to an embodiment of the present invention, when an error message is displayed, the controller 170 may count the number of error messages occurring in the process of executing the corresponding function and calculate the total number of error messages.

According to an embodiment of the present invention, the controller 170 may perform a step for inputting a user fingerprint again when the total number of error messages is smaller than a preset number. In this case, the controller 170 may output a message, a sound or a vibration for requesting a user to input a fingerprint again.

According to an embodiment of the present invention, when the total number of error messages is greater than or equal to a preset number, the controller 170 may determine whether the occurred error can be overcome by changing a security level.

According to an embodiment of the present invention, the controller 170 may compare the number of matching points sensed when a function is executed and the preset number of limited matching points. Here, the number of limited matching points may refer to the minimum number of matching points that may be adjusted for usability of fingerprint verification. The number of limited matching points may be set and changed by a manufacturer or a user.

According to an embodiment of the present invention, the controller 170 may terminate a request for executing the corresponding function when the number of matching points sensed when a function is executed is less than the preset number of limited matching points.

According to an embodiment of the present invention, the controller 170 may induce a user to adjust the security level of the corresponding function or the number of required matching points, when the number of matching points sensed is greater than or equal to the preset number of limited matching points.

According to an embodiment of the present invention, the controller 170 may recommend a security level of the corresponding function or the number of required matching points to a user. When the user does not adjust the security level of the corresponding function or the number of required matching points, the controller 170 may terminate a request for executing the corresponding function.

According to an embodiment of the present invention, the controller 170 may return to a step of acquiring a security level of the corresponding function and execute the corresponding function when the user adjusts a security level of the corresponding function or the number of required matching points. When a fingerprint for executing the corresponding function is successfully adjusted, the controller 170 may output a message, a sound, or a vibration for informing that the fingerprint has been successfully adjusted.

According to an embodiment of the present invention, the controller 170 may provide a user with aid in order to enhance usability of fingerprint verification. For example, the controller 170 may display one region or an entire region of the display unit 110 in different colors depending upon a security level of a function which a user wants to execute. The color Red may be used for a function requiring a first security level, the color Orange may be used for a function requiring a second security level, and the color Green may be used for a function requiring a third security level. These colors are merely examples and are not intended to specify colors according to security levels.

According to an embodiment of the present invention, the controller 170 may reproduce Visual Information (VI) or a fingerprint verification animation on the display unit 110 to enhance usability of fingerprint verification. For example, the controller 170 may reproduce an animation showing an operation through which a fingerprint may be accurately recognized. The angle of a finger for inputting a fingerprint and a contact area thereof are important in fingerprint verification, and therefore a user may be informed of a fingerprint verification scheme through such an animation. In this case, the animation may vary with the security level. For example, the controller 170 may reproduce a slow swiping animation to extract a number of minutiae when a higher security level is required and a moderate swiping animation when a normal security level is required. In addition, the controller 170 may display a color or reproduce an animation through the display unit 110, with explanatory text inserted therein.

According to an embodiment of the present invention, the controller 170 may store, in the storage unit 140, a database (DB) associated with fingerprint verification errors occurring when a user executes a particular function. For example, if an error occurs when a user executes a particular function, the controller 170 may store, in the storage unit 140, the number of matching points measured at that time. The controller 170 may calculate an average value using the number of matching points measured when an error occurs, and recommend an optimal security level or the number of required matching points for execution of the corresponding function, using the average value.

Figure 2:
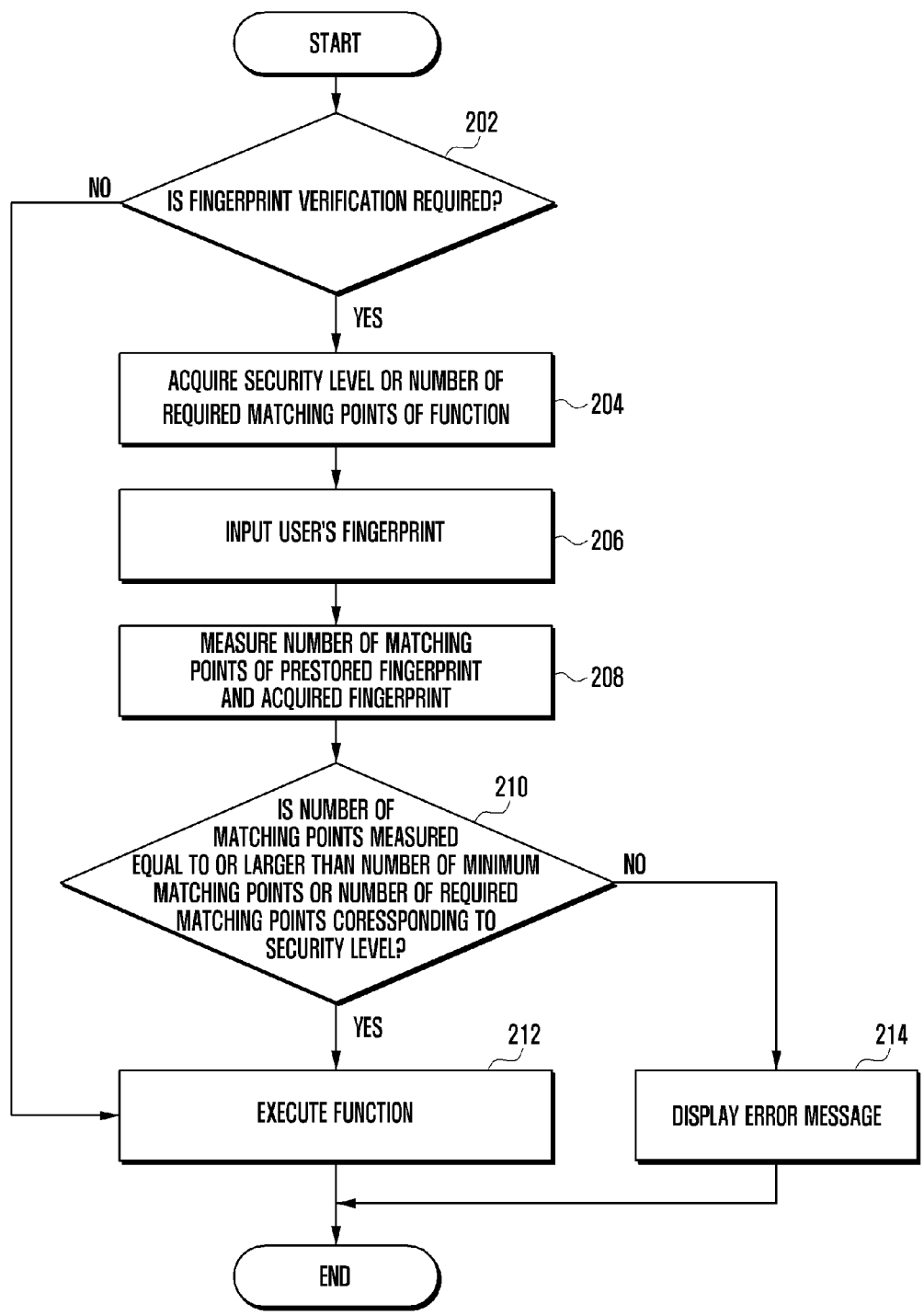
FIG. 2 is a flowchart illustrating a process of executing a function of an electronic device using fingerprint verification, according to an embodiment of the present invention.

FIG. 2 is a flowchart illustrating a process of executing a function of the electronic device 100 using fingerprint verification, according to an embodiment of the present invention.

In operation 202, the electronic device 100 determines whether a function to be executed by a user has been set to require fingerprint verification. When the function to be executed by the user does not require fingerprint verification, the electronic device 100 may execute the corresponding function without fingerprint verification, in operation 212. Setting fingerprint verification for a function to be executed by a user may be made and changed by a manufacturer, an application developer, or a user.

When the function to be executed requires fingerprint verification, the electronic device 100 acquires the security level for the function to be executed by the user, in operation 204. The security level and the minimum number of matching points corresponding thereto may vary depending upon the function. For example, a security level for an unlock function may be a third level, and a security level for a payment function may be a first level. The minimum number of matching points at the third level may be different from that at the first level. For example, the minimum number of matching points may be set to sixteen in the third level and to thirty two in the first level. The above example does not restrict various embodiments of the present invention.

In operation 204, the electronic device 100 may acquire the number of required matching points for the function to be executed by the user. The number of required matching points may vary depending upon the function. For example, the number of required matching points may be set to seventeen for the unlock function and to thirty four for the payment function. The above example does not restrict the various embodiments of the present invention.

In operation 206, the electronic device 100 receives the user's fingerprint using the fingerprint sensor 151. In this case, the electronic device 100 may display a different color or animation on the display unit 110 depending upon the security level or the number of required matching points in order to enhance usability of fingerprint verification for the user. In addition, the electronic device 100 may also display a help message on the display unit 110 to help with the user's comprehension.

According to an embodiment of the present invention, in operation 208, the electronic device 100 measures the number of matching points by comparing fingerprint information stored in the storage unit 140 with the fingerprint information sensed in operation 206.

In operation 210, the electronic device 100 may compare the minimum number of matching points corresponding to the security level acquired in operation 204 with the number of matching points measured in operation 208. When the number of matching points measured in operation 208 is greater than or equal to the minimum number of matching points corresponding to the security level acquired in operation 204, the electronic device 100 executes the corresponding function in operation 212. In contrast, when the number of matching points measured in operation 208 is less than the minimum number of matching points corresponding to the security level acquired in operation 204, the electronic device 100 displays an error message, in operation 214.

In operation 210, the electronic device 100 may compare the number of required matching points acquired in operation 204 with the number of matching points measured in operation 208. When the number of matching points measured in operation 208 is greater than or equal to the number of required matching points acquired in operation 204, the electronic device 100 executes the corresponding function, in operation 212. In contrast, when the number of matching points measured in operation 208 is less than the number of required matching points acquired in operation 204, the electronic device 100 displays an error message, in operation 214.

Figure 3:
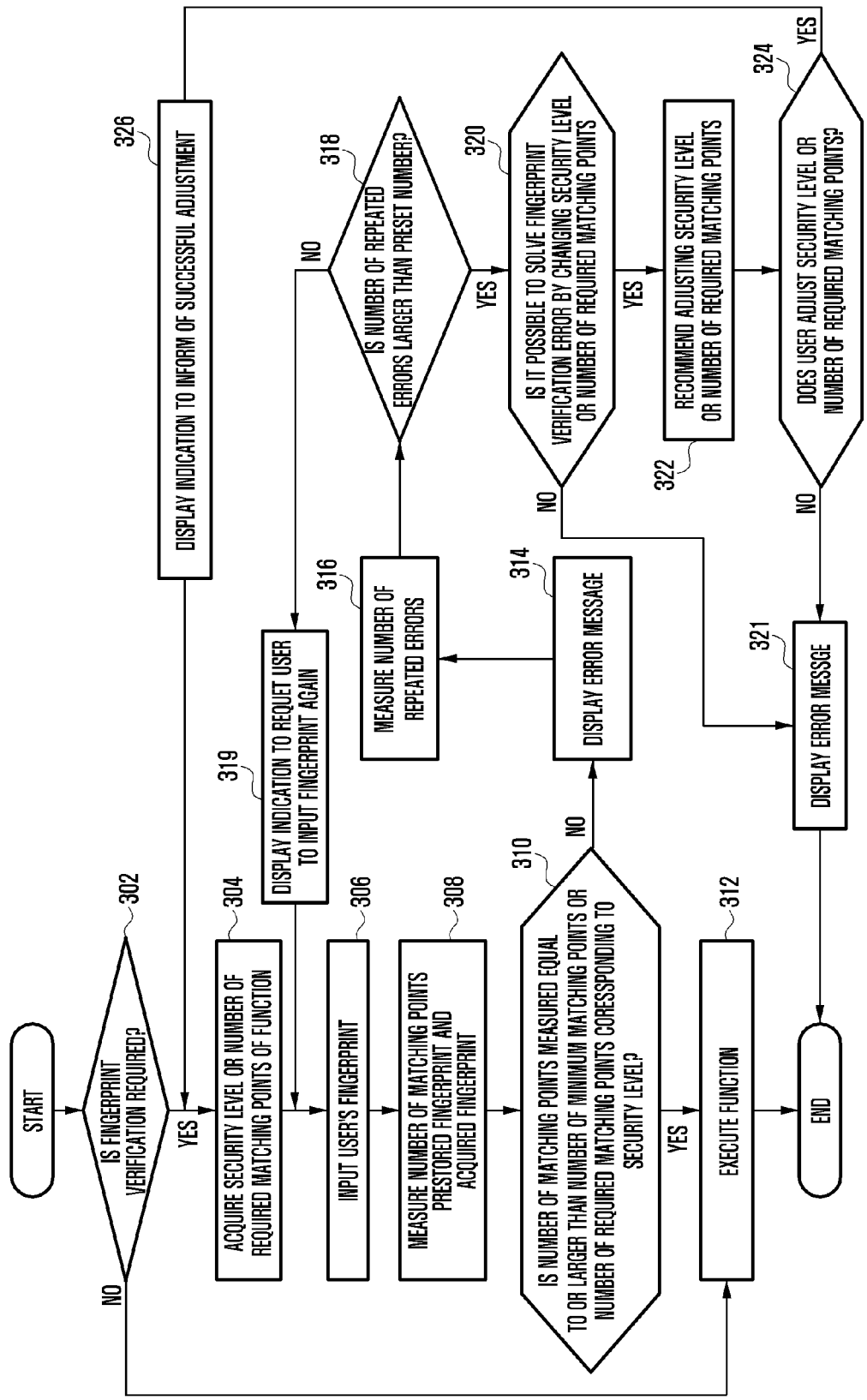
FIG. 3 is a flowchart illustrating a process of executing a function of an electronic device by adjusting the security level or the number of required matching points depending upon fingerprint verification, according to an embodiment of the present invention.

FIG. 3 is a flowchart illustrating a process of executing a function of the electronic device 100 by adjusting the security level or the number of required matching points, according to an embodiment of the present invention.

With respect to FIG. 3, operations 302, 304, 306, 308, 310, 312, and 314 are substantially identical to operations 202, 204, 206, 208, 210, 212, and 214 of FIG. 2.

According to an embodiment of the present invention, when displaying an error message in operation 314, the electronic device 100 measures the total number of produced error messages, in operation 316.

In operation 318, the electronic device 100 compares the total number of produced error messages with the preset number of errors. The preset number of errors may be set by a manufacturer or a user.

When the total number of produced error messages is less than the preset number of errors, the electronic device 100 outputs a message, an alert sound, or vibration to request a user to input a fingerprint again due to failure in fingerprint verification, in operation 319. Thereafter, the electronic device 100 may proceed to operation 306 to receive the user's fingerprint again.

When the total number of produced error messages is greater than or equal to the preset number of errors, in operation 320, the electronic device 100 determines whether the corresponding function may be executed when the security level changes. That is, when an average value of the number of matching points measured a preset number of times in operation 308 is greater than or equal to the preset number of limited matching points, the electronic device 100 adjusts the security level to execute the corresponding function. Here, the number of limited matching points may refer to the minimum number of matching points which may be adjusted for usability of fingerprint verification. The number of limited matching points may be set and changed by a manufacturer or a user.

A security level acquired in operation 304 may be a second level, and the minimum number of matching points corresponding thereto may be set to twenty four. It may be assumed that the average value of the number of matching points measured a preset number of times in operation 308 is twenty and the number of limited matching points is set to sixteen. In this case, the average value of the number of matching points measured a preset number of times, in operation 308, is less than the minimum number of matching points corresponding to the second security level and greater than the number of limited matching points. The electronic device 100 may change the security level of the corresponding function to the third level. Here, the minimum number of matching points corresponding to the third security level may be set to, for example, sixteen. After the adjustment of the security level, if twenty matching points are measured when the electronic device 100 senses the user's fingerprint again, in operation 306, the electronic device 100 may execute the corresponding function through the adjustment of the security level. As in the above example, the number of limited matching points may be the same as that of the minimum number of matching points corresponding to the lowest security level which the user can set.

If the average value of the number of matching points measured a preset number of times, in operation 308, is fourteen, this average value may be less than the number of limited matching points, that is, sixteen. In this case, the security level does not need to be adjusted, and therefore the electronic device 100 may proceed to operation 321 and display an error message informing that the corresponding function cannot be executed. Thereafter, the electronic device 100 may terminate the request for executing the corresponding function.

When it is determined that the fingerprint verification error can be solved by changing the security level, in operation 320, the electronic device 100 recommends an optimal security level to the user to execute the corresponding function, in operation 322. Here, the optimal security level may be a range including the average value of the number of matching points measured a preset number of times, in operation 308. The minimum number of matching points for the corresponding security level may be greater than or equal to the number of limited matching points. Although a recommendation on the optimal security level is given to the user, the electronic device 100 may not automatically change the security level of the corresponding function to the optimal security level without the user's determination.

In operation 324, it is determined whether user accepts the optimal security level recommended by the electronic device. When the user accepts the optimal security level recommended by the electronic device 100, the electronic device 100 outputs a message or a sound informing that the security level has been successfully changed, in operation 326. Thereafter, the electronic device 100 returns to operation 304 and acquires the security level of the function which the user wants to execute, thereby executing the corresponding function.

When the user does not accept the optimal security level recommended by the electronic device 100, the electronic device 100 proceeds to operation 321 and displays an error message informing that the function cannot be executed. Thereafter, the electronic device 100 terminates the user's request for executing the corresponding function.

Unlike an embodiment of the present invention relating to an adjustment of the security level, as an alternative, in operation 320, the electronic device 100 may determine whether the corresponding function can be executed if the number of required matching points is changed, when the total number of produced error messages is greater than or equal to the preset number of errors. That is, when the average value of the number of matching points measured a preset number of times in operation 308 is greater than or equal to the preset number of limited matching points, the electronic device 100 may adjust the number of required matching points to execute the corresponding function. Here, the number of limited matching points may mean the minimum number of matching points that may be adjusted for usability of fingerprint verification. The number of limited matching points may be set and changed by a manufacturer or a user.

According to an embodiment of the present invention, the number of required matching points acquired in operation 304 may be twenty four. It may be assumed that the average value of the number of matching points measured a preset number of times in operation 308 is twenty and the number of limited matching points is set to sixteen. In this case, the average value of the number of matching points measured a preset number of times in operation 308 is smaller than the number of required matching points and larger than the number of limited matching points. The electronic device 100 may set the number of required matching points of the corresponding function to nineteen. After the adjustment, if twenty matching points are measured when the electronic device 100 senses the user's fingerprint again in operation 306, the electronic device 100 may execute the corresponding function through the adjustment of the number of required matching points.

According to an embodiment of the present invention, if the average value of the number of matching points measured a preset number of times in operation 308 is fourteen, this average value may be smaller than the number of limited matching points, that is, sixteen. In this case, the number of required matching points does not need to be adjusted, and therefore the electronic device 100 may proceed to operation 321 and display an error message informing that the corresponding function cannot be executed. Thereafter, the electronic device 100 may terminate the request for executing the corresponding function.

According to an embodiment of the present invention, when it is determined that the fingerprint verification error can be solved by adjusting the number of required matching points, the electronic device 100 may recommend, to the user, the optimal number of required matching points for executing the corresponding function, in operation 322. Here, the optimal number of required matching points may be a region including the average value of the number of matching points measured a preset number of times in operation 308. The number of required matching points for executing the corresponding function may be greater than or equal to the number of limited matching points. Although recommending the optimal number of required matching points to the user, the electronic device 100 may not automatically adjust the optimal number of required matching points without the user's determination.

According to an embodiment of the present invention, when the user accepts the optimal number of required matching points recommended by the electronic device 100, the electronic device 100 may output a message or a sound informing that the number of required matching points has been successfully changed, in operation 326. Thereafter, the electronic device 100 may proceed to operation 304 and acquire the number of required matching points of the function which the user wants to execute, thereby executing the corresponding function.

According to an embodiment of the present invention, when the user does not accept the optimal number of required matching points recommended by the electronic device 100, the electronic device may proceed to operation 321 and display an error message informing that the corresponding function cannot be executed. Thereafter, the electronic device 100 may terminate the user's request for executing the corresponding function.

Figure 4:
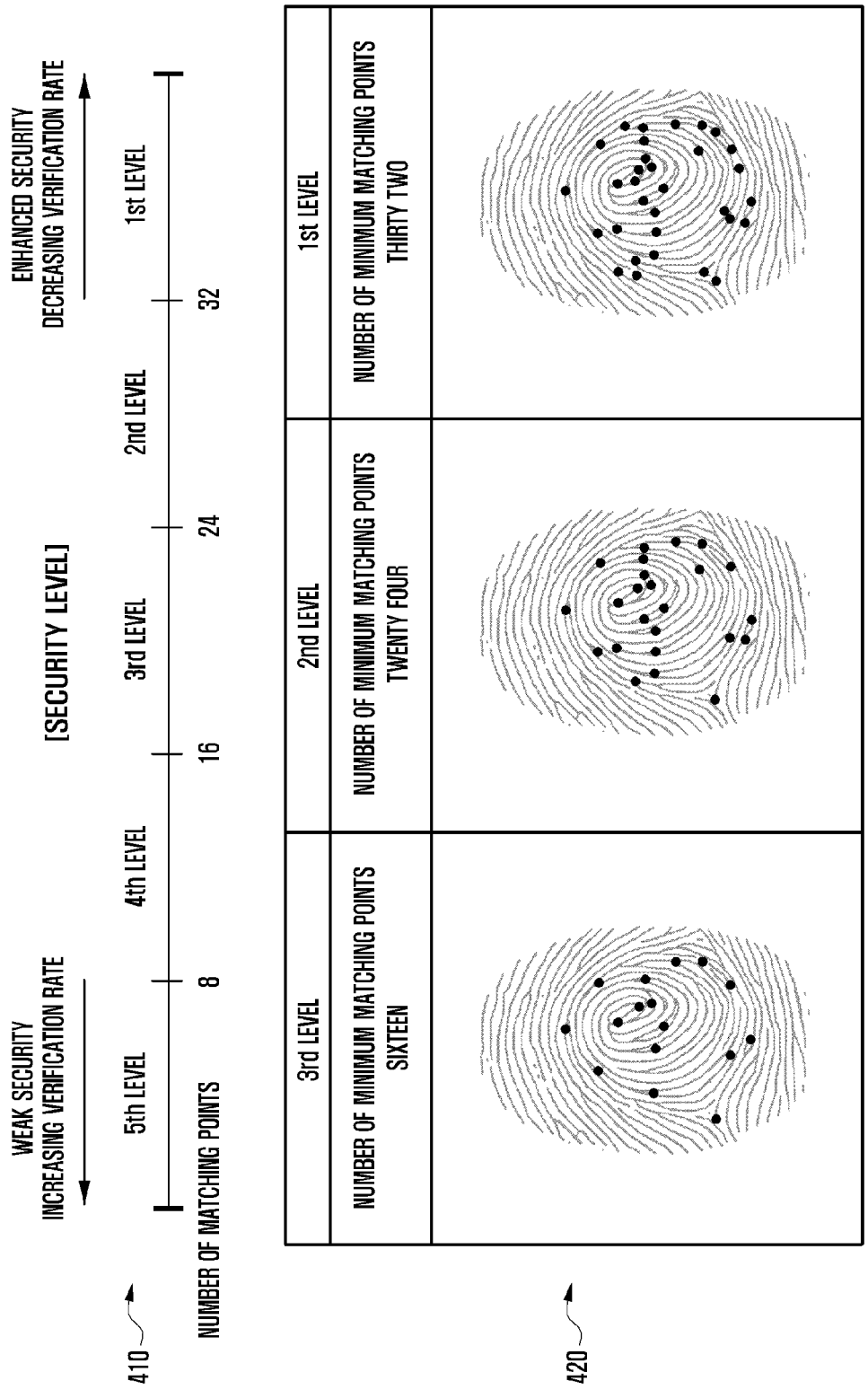
FIG. 4 illustrates security levels for fingerprint verification of an electronic device and the number of matching points corresponding thereto, according to an embodiment of the present invention.

FIG. 4 illustrates security levels for fingerprint verification of an electronic device and the number of matching points corresponding thereto, according to an embodiment of the present invention.

Reference numeral 410 indicates security levels for fingerprint verification of the electronic device 100 and the number of matching points corresponding thereto. The minimum number of matching points is set to sixteen for the third security level, twenty four for the second security level, and thirty two for the first security level. In this case, in order to maintain execution of a function at the third security level or higher, the number of limited matching points may be set to sixteen, which is the same as the minimum number of matching points at the third level. As the security level of a function approaches the first level, security may be enhanced, and yet usability of fingerprint verification may be decreased due to a decreasing verification rate. In contrast, as the security level of a function approaches the fifth level, security may become weak, and yet usability of fingerprint verification may increase due to an increasing verification rate. The number of matching points corresponding to a security level for fingerprint verification and a security level section may be set by a manufacturer or a user.

Reference numeral 420 indicates matching points corresponding to each security level, with a user's fingerprint serving as an example. When the number of matching points measured is greater than or equal to the minimum number of matching points corresponding to the security level, the electronic device 100 may execute the corresponding function.

Figure 5:
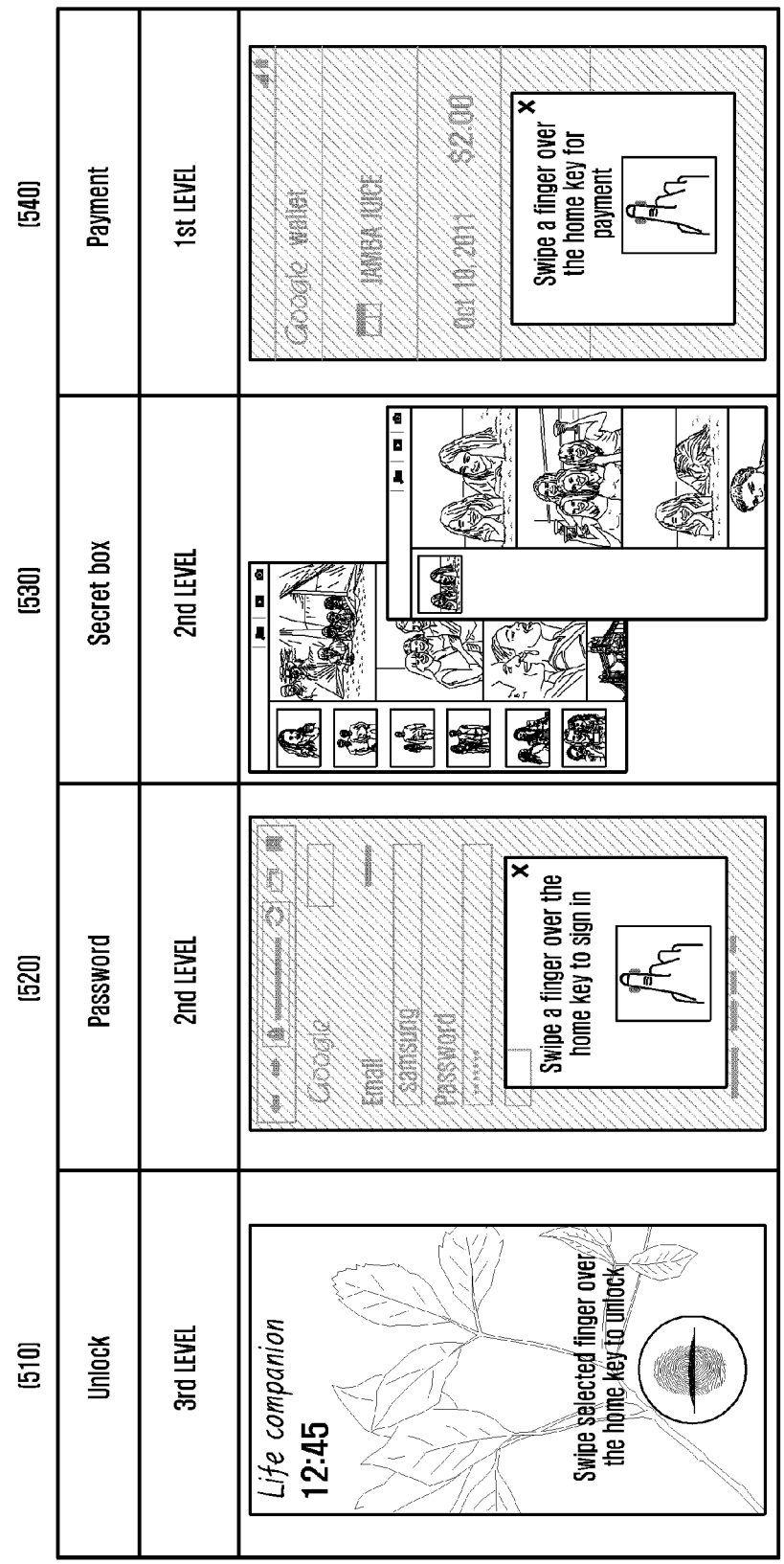
FIG. 5 illustrates an example of distinguishing between security levels of user-executed functions depending upon types thereof, according to an embodiment of the present invention.

FIG. 5 illustrates an example of distinguishing between security levels of user-executed functions depending upon types thereof, according to an embodiment of the present invention.

As indicated by reference numeral 510, the electronic device 100 may set the security level of an unlock function, which a user most frequently uses, to the third level. That is, since the unlock function is required to be performed when the electronic device 100 is used, the security level thereof may be set to a relatively low security level, thereby ensuring fast accessibility. However, even in this case, the security level of the unlock function corresponds to the third level, which makes it possible to maintain minimum security.

As indicated by reference numerals 520 and 530, the electronic device 100 may set the security level to the second level when loading a stored password of a web browser or accessing locked content. The functions are closely associated with a user's personal information, and therefore the security levels thereof may be set in consideration of security as well as accessibility.

As indicated by reference numeral 540, the electronic device 100 may set the security level of a payment function to a first level. The highest security level is required for functions associated with payment, thereby preventing financial damages of a user using the electronic device 100. The assignment of different security levels to functions is provided to help with comprehension of embodiments of the present invention, however the present invention is not limited thereto.

Figure 6A:
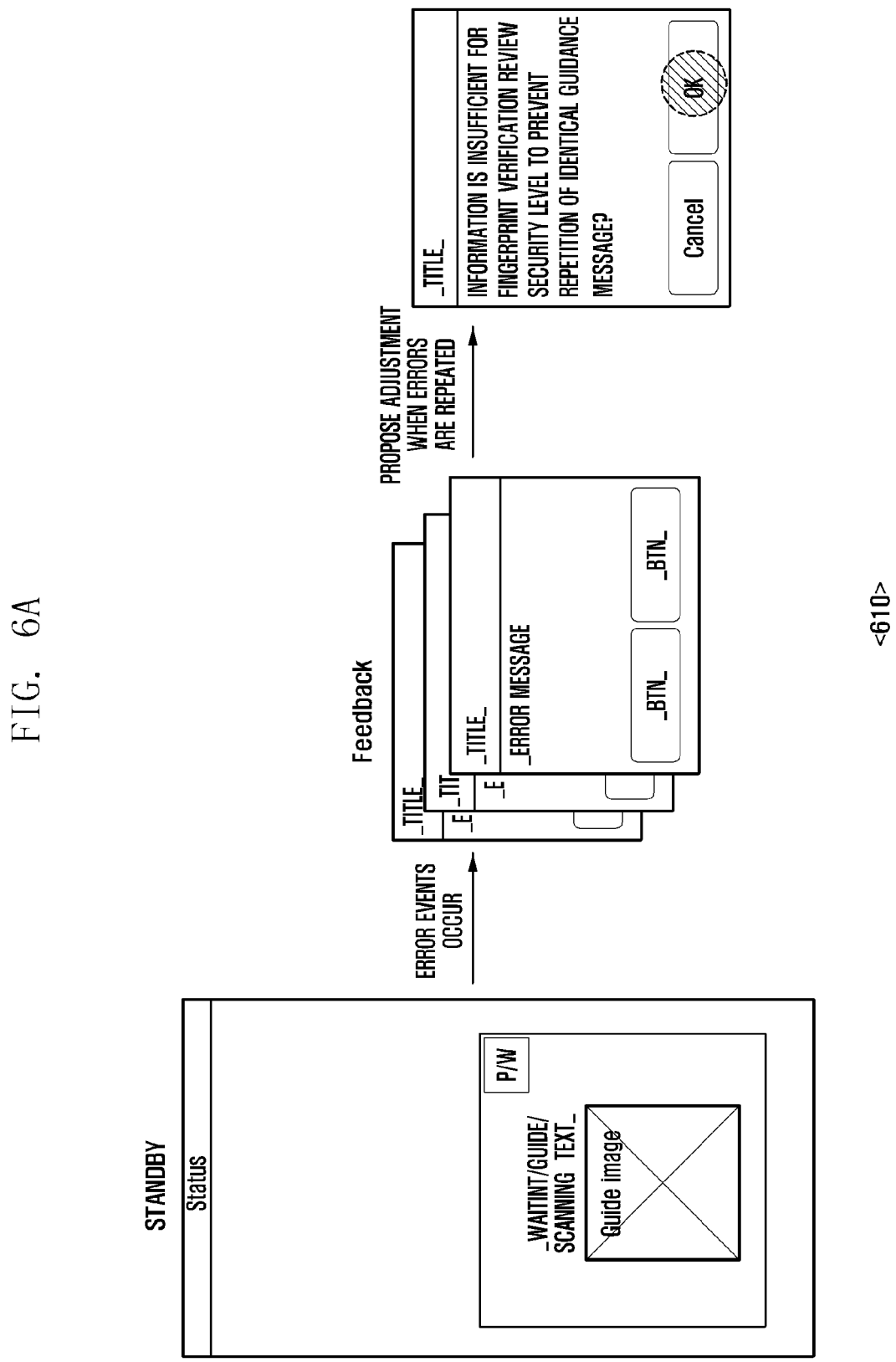
FIGS. 6A to 6C illustrate a process of adjusting a security level by recommending that a user adjust the security level when fingerprint verification repetitively fails, according to an embodiment of the present invention.
Figure 6B:
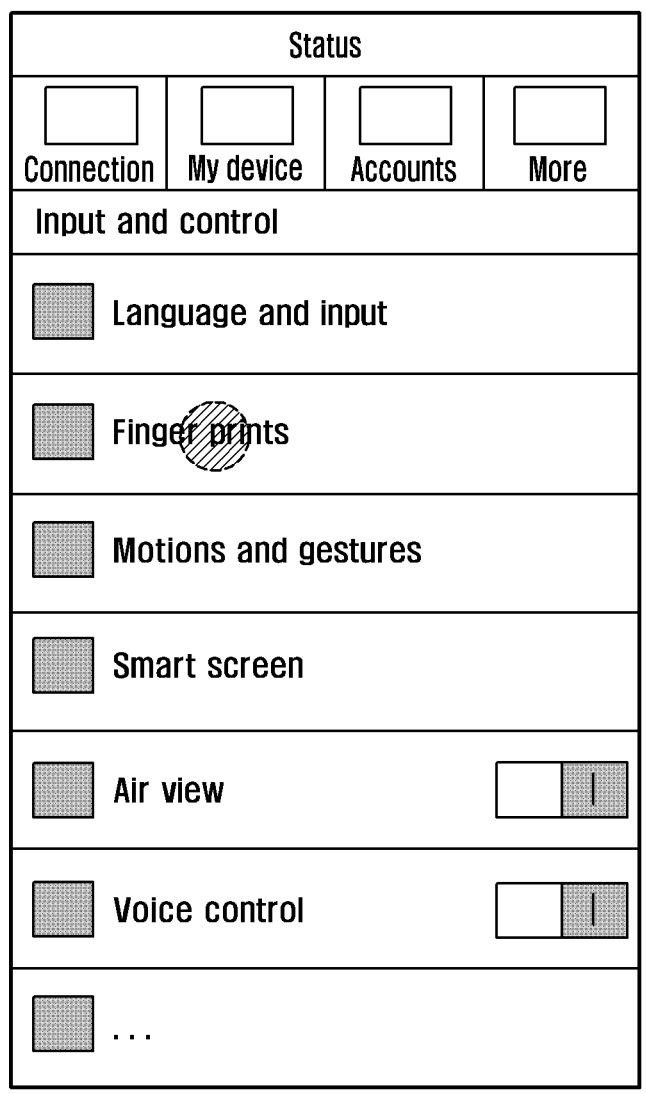
Figure 6C:
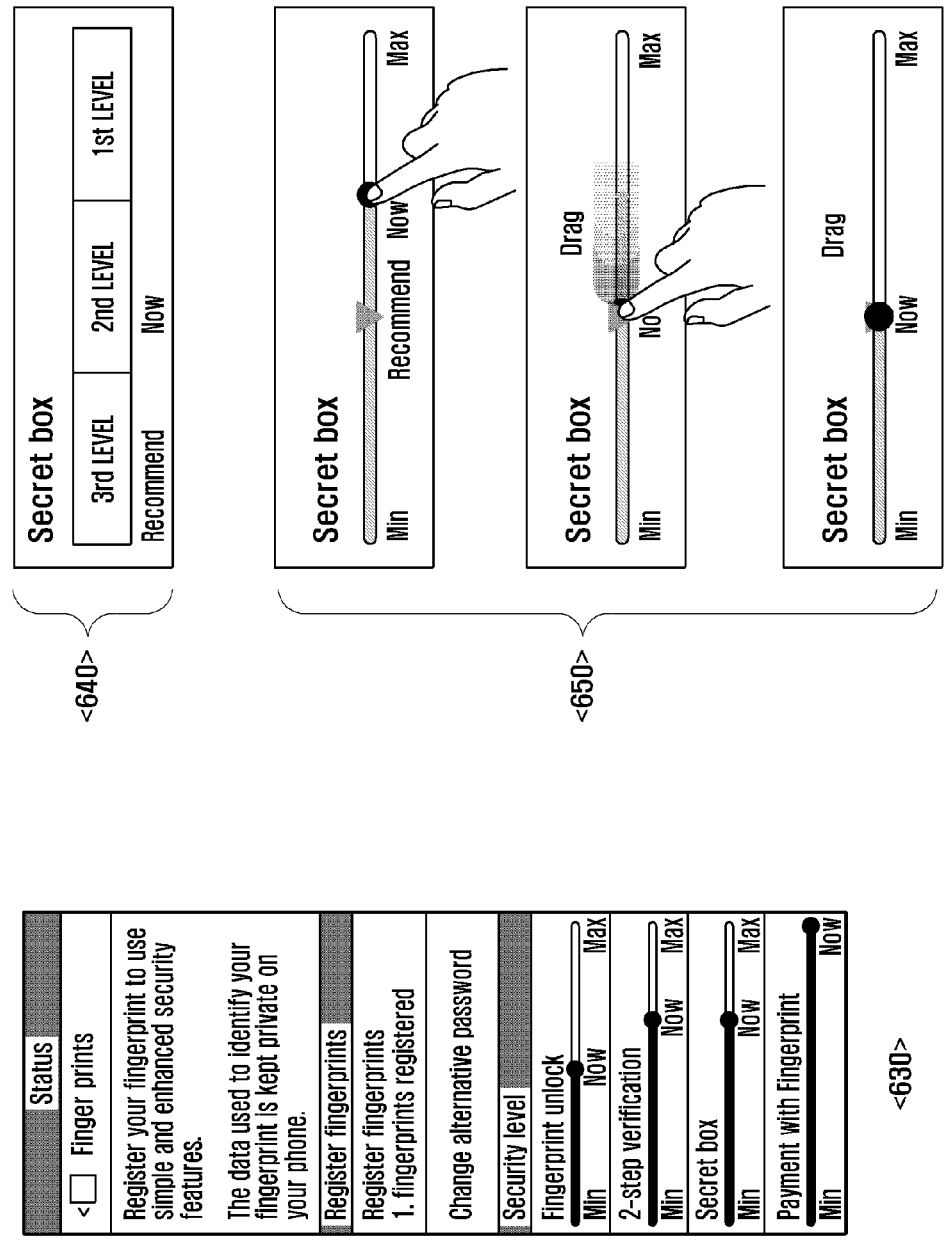

FIGS. 6A to 6C illustrate a process in which the electronic device 100 recommends that a user adjust a security level and the user accordingly adjusts the security level, according to an embodiment of the present invention.

As indicated by reference numeral 610 of FIG. 6A, when a user repetitively fails fingerprint verification for executing a particular function, the electronic device 100 recommends that the user adjust the security level or the number of required matching points. When accepting the recommendation, the user using the electronic device 100 enters a fingerprint verification setting mode and adjusts the security level of the corresponding function or the number of required matching points, as indicated by reference numeral 630, in FIG. 6C.

As indicated by reference numeral 620 of FIG. 6B, the user using the electronic device 100 may directly select the fingerprint verification setting mode in a status setting menu, unlike the case in which the entrance to the fingerprint verification setting mode is made with the user's consent after errors repetitively occur, as indicated by reference numeral 610. In this case, as indicated by reference numeral 630, the user using the electronic device 100 may enter the fingerprint verification setting mode and adjust the security level of the corresponding function or the number of required matching points.

Reference numeral 640 of FIG. 6C indicates a view illustrating a case in which the user using the electronic device 100 adjusts a security level. For example, when a security level of locked content (e.g., secret box) is currently set to the second level, the electronic device 100 may recommend that the user decrease the security level of the corresponding function down to the third level. The user may change the security level by selecting the third level recommended by the electronic device 100.

Reference numeral 650 of FIG. 6C indicates a view illustrating a case in which the user using the electronic device 100 adjusts the number of required matching points. For example, when the number of required matching points for executing the lock content (e.g., secret box) is set to twenty four, the electronic device 100 may recommend that the user decrease the number of required matching points down to sixteen. The user may adjust the number of required matching points for executing the corresponding function by dragging a pointer to the number of required matching points recommended by the electronic device 100.

According to an embodiment of the present invention, the user using the electronic device 100 may adjust the range of the number of matching points, such as the security level, or the specific number of matching points, such as the number of required matching points, in order to enhance the fingerprint verification rate. Meanwhile, the electronic device 100 may recommend an optimal security level or the number of required matching points to the user, based on a database stored in the storage unit 140 and associated with fingerprint verification errors having occurred in execution of a particular function. For example, if an error occurs when the user executes a particular function, the electronic device 100 may store the number of matching points of minutiae measured when the error occurs. The electronic device 100 may calculate an average value of the number of matching points stored and recommend an optimal security level or the number of required matching points to the user using the average value as indicted by reference numerals 640 and 650.

Figure 7A:
FIGS. 7A and 7B illustrate processes of providing a user with a fingerprint verification guide through color, Visual Information (VI), animation, and sound when fingerprint verification is performed, according to an embodiment of the present invention.
Figure 7A:
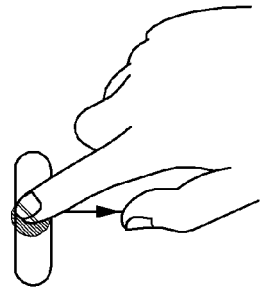
Figure 7A:
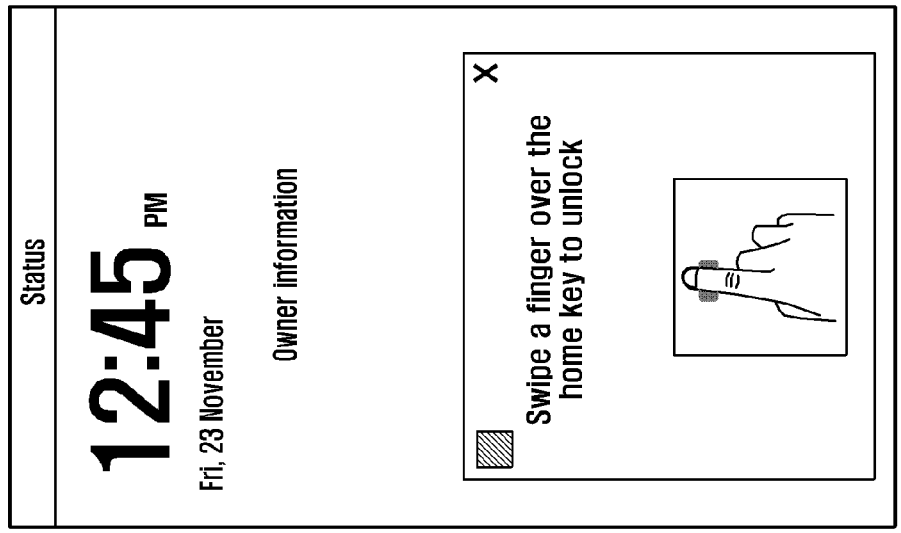
Figure 7B:
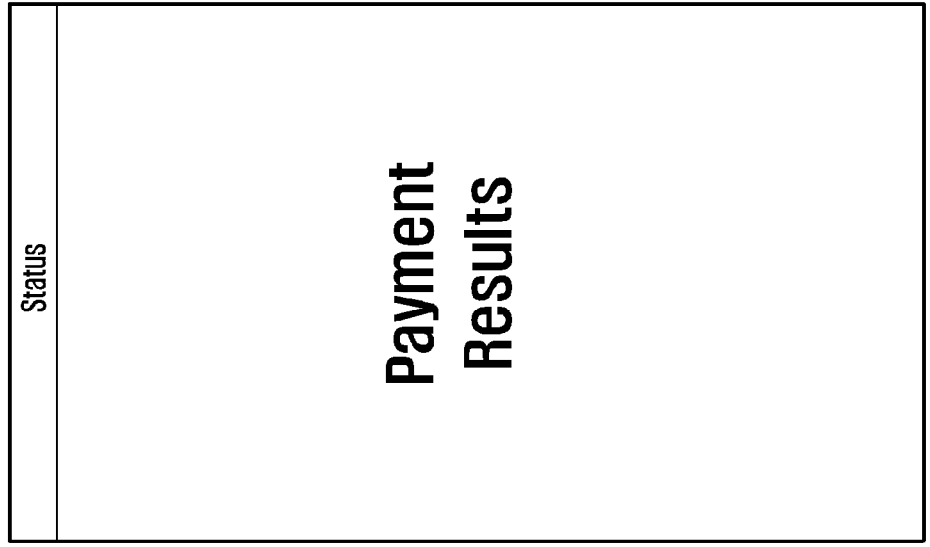
Figure 7B:
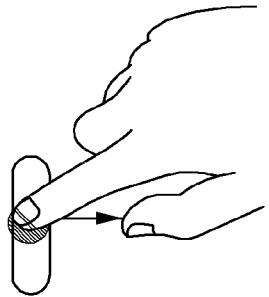
Figure 7B:
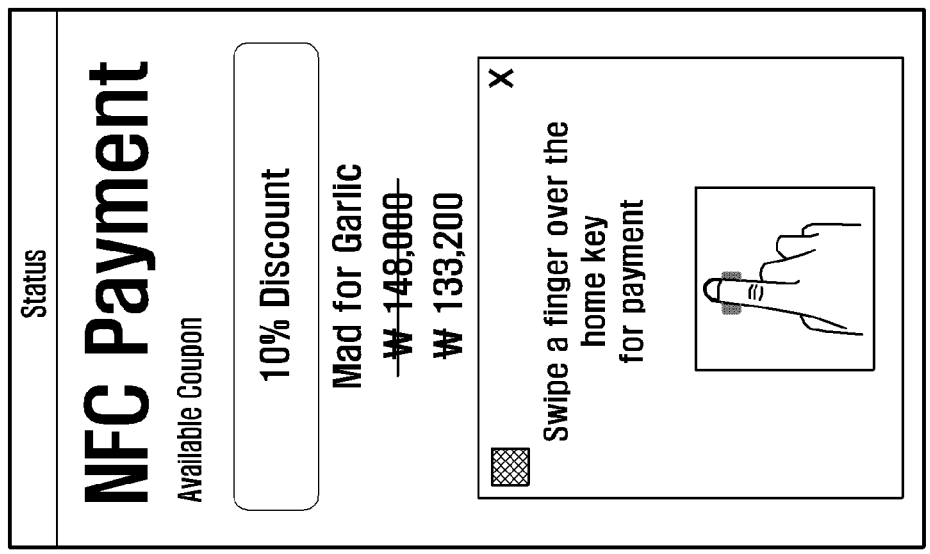

FIGS. 7A and 7B illustrate processes of providing a user with a fingerprint verification guide through color, visual information (VI), animation, and sound, when fingerprint verification is performed, according to an embodiment of the present invention.

Reference numeral 710 of FIG. 7A indicates a view illustrating a case of executing an unlock function in the electronic device 100. The unlock function may require the third security level as indicated by reference numeral 510 of FIG. 5 and therefore, be displayed in green, thereby intuitively informing a user of the security level thereof. In this case, the electronic device 100 may display a fingerprint input animation at a normal speed, together with a help message.

Reference numeral 720 of FIG. 7B indicates a view illustrating a case of executing a payment function in the electronic device 100. The payment function may require the first security level as indicated by reference numeral 540 of FIG. 5 and therefore, be displayed in red, thereby intuitively informing a user of the security level thereof. In this case, the electronic device 100 may display a fingerprint input animation at a lower speed, together with a help message.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of executing a function of an electronic device using fingerprint verification, the method comprising:
   acquiring a security level of the function to be performed, if the function requires the fingerprint verification;
   receiving a fingerprint input of a user;
   determining a count of a number of matching points that exist between the fingerprint input and a prestored fingerprint;
   comparing the count of the number of matching points with a minimum number of matching points corresponding to the security level of the function;
   displaying an error message when the count of the number of matching points is less than the minimum number of matching points corresponding to the security level of the function;
   determining, if a number of times that the error message has been displayed is greater than or equal to a preset number, whether the function is to be executed by changing the security level of the function; and
   changing the security level of the function and executing the function,
   wherein changing the security level of the function comprises changing the minimum number of matching points corresponding to the security level of the function for executing the function.

2. The method of claim 1, wherein determining the count of the number of matching points comprises:
   determining the count of the number of matching points by comparing minutiae of the fingerprint input and minutiae of the prestored fingerprint.

3. The method of claim 1, further comprising:
   executing the function when the count of the number of matching points is greater than or equal to the minimum number of matching points corresponding to the security level.

4. The method of claim 3, further comprising:
receiving the fingerprint input again when a number of times that the error message has been displayed is less than a preset number.

5. The method of claim 4, wherein determining whether the function is to be executed by changing the security level comprises:
comparing the count of the number of matching points measured and a preset number of limited matching points.

6. The method of claim 5, further comprising:
changing the security level of the function by the user, when the count of the number of matching points is greater than or equal to the preset number of limited matching points.

7. The method of claim 6, wherein changing the security level of the function by the user comprises:
recommending an optimal security level, at which the function is to be executed, to the user by the electronic device.

8. The method of claim 6, further comprising:
when the user changes the security level of the function, acquiring a new security level of the function and re-receiving a fingerprint input.

9. The method of claim 1, wherein receiving the fingerprint input comprises:
displaying a color on a portion of a display or on an entire display, wherein the color is dependent upon the security level, or
displaying at least one of a guide and an animation, wherein content of the guide and a speed of the animation is dependent upon the security level.

10. A method of executing a function of an electronic device using fingerprint verification, the method comprising:
acquiring a number of required matching points corresponding to the function to be performed, if the function requires the fingerprint verification;
receiving a fingerprint input of a user;
determining a count of a number of matching points that exist between the fingerprint input and a prestored fingerprint;
comparing the count of the number of matching points with the number of required matching points;
displaying an error message when the count of a the number of matching points is less than the number of required matching points corresponding to a security level of the function;
determining, if a number of times that the error message has been displayed is greater than or equal to a preset number, whether the function is to be executed by changing the security level of the function; and
changing the security level of the function and executing the function,
wherein changing the security level of he function comprises changing the number of required matching points corresponding to the security level of the function for executing the function.

11. An electronic device comprising:
a display unit configured to display an indication and a guide for inputting a fingerprint;
a fingerprint sensor configured to sense a fingerprint input of a user;
a memory configured to store the fingerprint input; and
a processor configured to:
acquire a security level of a function to be performed if the function requires fingerprint verification,
receive the fingerprint input,
determine a count of a number of matching points that exist between the fingerprint input and a prestored fingerprint,
compare the count of the number of matching points with a minimum number of matching points corresponding to the security level,
display an error message when the count of the number of matching points is less than the minimum number of matching points corresponding to the security level of the function,
determine, if a number of times that the error message has been displayed is greater than or equal to a preset number, whether the function is to be executed by changing the security level of the function, and
change the security level of the function and execute the function,
wherein the processor is configured to change the security level of the function by changing the minimum number of matching points corresponding to the security level of the function for executing the function.

12. The electronic device of claim 11, wherein the processor is further configured to determine the count of the number of matching points by comparing minutiae of the fingerprint input and minutiae of the prestored fingerprint.

13. The electronic device of claim 11, wherein the processor is further configured to execute the function when the count of the number of matching points is greater than or equal to the minimum number of matching points corresponding to the security level.

14. The electronic device of claim 11, wherein the processor is further configured to receive the fingerprint input again when a number of times that the error message has been displayed is less than a preset number.

15. The electronic device of claim 11, wherein the determination of whether the function is to be executed is made by comparing the count of the number of matching points measured and a preset number of limited matching points.

16. The electronic device of claim 15, wherein the processor is further configured to allow the user to change the security level of the function when the count of the number of matching points is greater than or equal to the preset number of limited matching points, and the change of the security level is made by recommending an optimal security level, at which the function is to be executed, to the user by the electronic device.

17. The electronic device of claim 16, wherein, when the user changes the security level of the function, the processor is further configured to acquire a new security level of the function again and re-receives a fingerprint input.

18. The electronic device of claim 11, wherein the processor is further configured to display a color on a portion of a display or on an entire display, wherein the color is dependent upon the security level, or display at least one of a guide and an animation, wherein content of the guide and a speed of the animation is dependent upon the security level.

19. An electronic device comprising:
a display unit configured to display an indication and a guide for inputting a fingerprint;
a fingerprint sensor configured to sense a fingerprint input of a user;
a memory configured to store the fingerprint input; and
a processor configured to:
acquire a number of required matching points corresponding to the function to be performed if the function requires the fingerprint verification,
receive the fingerprint input, determine a count of a number of matching points that exist between fingerprint input and a prestored fingerprint, compare the count of the number of matching points with the number of required matching points, display an error message when the count of the number of matching points is less than the number of required matching points corresponding to the function, determine, if a number of times that the error message has been displayed is greater than or equal to a preset number, whether the function is to be executed by changing the number of required matching points of the function, and change the number of required matching points of the function and execute the function.

* * * * *